(12) United States Patent
Miller

(10) Patent No.: US 6,529,653 B1
(45) Date of Patent: Mar. 4, 2003

(54) SYSTEM AND METHOD FOR ORIENTING AND POSITIONING OPTICAL FIBERS

(75) Inventor: Robert O. Miller, Carrollton, TX (US)

(73) Assignee: Optical Switch Corporation, Richardson, TX (US)

( * ) Notice: Subject to any disclaimer, the term of this patent is extended or adjusted under 35 U.S.C. 154(b) by 52 days.

(21) Appl. No.: 09/832,377

(22) Filed: Apr. 11, 2001

(51) Int. Cl.$^7$ ............... G02B 6/35; G02B 6/26
(52) U.S. Cl. ............... 385/16; 385/18; 385/52
(58) Field of Search ............... 385/16–23, 50, 385/52, 65, 83

(56) References Cited

U.S. PATENT DOCUMENTS

| | | |
|---|---|---|
| 4,208,094 A | 6/1980 | Tomlinson, III et al. |
| 4,278,327 A | 7/1981 | McMahon et al. |
| 4,445,752 A | 5/1984 | Faber et al. |
| 4,746,191 A | 5/1988 | Kawakami et al. |
| 4,759,597 A | 7/1988 | Lemonde |
| 4,946,236 A | 8/1990 | Dautartas et al. |
| 5,000,532 A | 3/1991 | Kraetsch et al. |
| 5,110,194 A | 5/1992 | Zurfluh |
| 5,168,535 A | 12/1992 | Laor |
| 5,221,987 A | 6/1993 | Laughlin |
| 5,345,521 A | 9/1994 | McDonald et al. |
| 5,369,718 A | 11/1994 | Kamata et al. |
| 5,436,986 A | 7/1995 | Tsai |
| 5,444,801 A | 8/1995 | Laughlin |
| 5,446,810 A | 8/1995 | Watanabe et al. |
| 5,553,175 A | 9/1996 | Laughlin |
| 5,555,327 A | 9/1996 | Laughlin |
| 5,555,558 A | 9/1996 | Laughlin |
| 5,566,260 A | 10/1996 | Laughlin |
| 5,647,033 A | 7/1997 | Laughlin |
| 5,841,916 A | 11/1998 | Laughlin |
| 5,875,271 A | 2/1999 | Laughlin |
| 5,909,301 A | 6/1999 | Laughlin |
| 5,917,641 A | 6/1999 | Laughlin |
| 6,009,219 A | 12/1999 | Doyle |
| 6,393,174 B1 * | 5/2002 | Karaguleff et al. ......... 385/16 |

OTHER PUBLICATIONS

John M. Senior, "Optical Fiber Communications—Principles and Practice", 2 cover sheets and pp. 97–99, and 154, Prentice Hall, 1992.

* cited by examiner

*Primary Examiner*—John D. Lee
*Assistant Examiner*—Sarah U Song
(74) *Attorney, Agent, or Firm*—Baker Botts L.L.P.

(57) ABSTRACT

An optical switch (10) includes an aligning member (12) with an aperture (28) extending between opposite sides to define an aligning groove (32). A first output waveguide (16) is in the aligning groove. An input waveguide (14) and a second output waveguide (18) are in a further groove (50) in the aligning member. The second output waveguide can move between two positions where optical signals from the input waveguide are respectively directed into the first and second output waveguides. In a variation, an aligning member (102) includes a plurality of the optical switches arranged to form a 1×N switching fabric (100). Further, two such switching fabrics (212, 213) can be coupled to define an M×N switching fabric (210).

28 Claims, 5 Drawing Sheets

US 6,529,653 B1

SYSTEM AND METHOD FOR ORIENTING AND POSITIONING OPTICAL FIBERS

TECHNICAL FIELD OF THE INVENTION

This invention relates generally to the field of optical devices and, more particularly, to a system and method of orienting and positioning optical fibers.

BACKGROUND OF THE INVENTION

Fiber-optic communications systems include optical components, such as optical fibers coupled to switching components, that receive, transmit, and otherwise process information in optical signals. The switching components in a fiber-optic communication system selectively direct optical signals to one or more other optical components. A problem with existing fiber-optic communication systems is that switching an optical signal between fibers requires precise fiber alignment. Known alignment techniques often require additional components that increase the cost and size of switching components. In addition, known alignment techniques are often not easily repeatable, leading to component failure due to fiber misalignment. Moreover, these considerations can compound when multiple optical switches are combined in order to create a switch fabric, such as a 1×N switch fabric, or a M×N switch fabric.

SUMMARY OF THE INVENTION

From the foregoing, it will be recognized that a need has developed for an optical switch fabric which substantially eliminates or reduces the disadvantages and problems associated with previous arrangements. According to the present invention, a method and apparatus are provided to meet this need, and involve creating a first aperture in a first aligning member which has first and second sides, the first aperture extending between and opening through each of the first and second sides of the first aligning member, and having therein a first groove which extends between the first and second sides of the first aligning member, and creating a second aperture in a second aligning member which has first and second sides, the second aperture extending between and opening through each of the first and second sides of the second aligning member, and having therein a second groove which extends between the first and second sides of the second aligning member. The method and apparatus further involve fixedly coupling the first and second aligning members to each other with the second side of the second aligning member disposed adjacent the second side of the first aligning member in a manner so that the first groove in the first aperture extends parallel to and has a predetermined alignment with respect to the second groove in the second aperture, and positioning against the first side of the first aligning member a first waveguide which includes two first sections arranged in an end-to-end relationship, the adjacent ends of the first sections forming a first switching portion which is disposed adjacent an end of the first aperture and which has one of the ends therein supported for movement between first and second positions respectively adjacent and spaced from the other of the ends therein. The method and apparatus also involve positioning against the first side of the second aligning member a second waveguide which includes two second sections arranged in an end-to-end relationship, the adjacent ends of the second sections forming a second switching portion which is disposed adjacent an end of the second aperture and which has one of the ends therein supported for movement between first and second positions respectively adjacent and spaced from the other of the ends therein; positioning in the first and second grooves a third waveguide so that opposite ends of the third waveguide are respectively disposed adjacent the other end in the first switching portion and the other end in the second switching portion; and causing each of the first and second switching portions to operate in a manner such that, when the movable end therein is respectively in the first and second positions thereof, that switching portion respectively establishes a first optical path in which radiation travels between the ends therein exclusive of the third waveguide, and a second optical path in which radiation travels between the non-movable end therein and the third waveguide exclusive of the movable end therein.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1A:
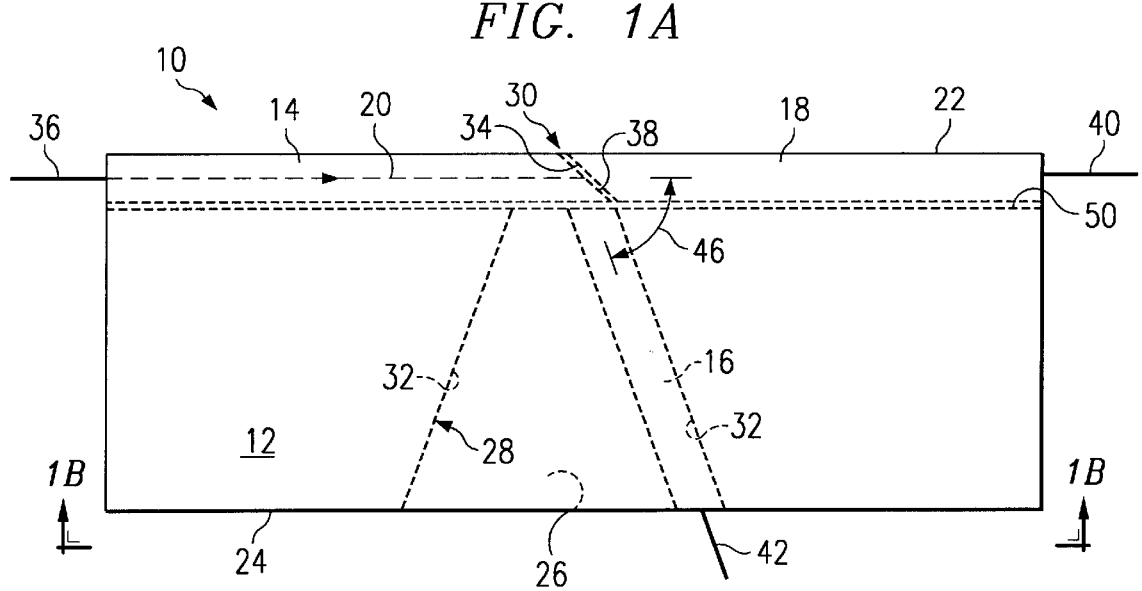
FIG. 1A is a diagrammatic side view of one embodiment of an optical switch which embodies the present invention.
Figure 1B:
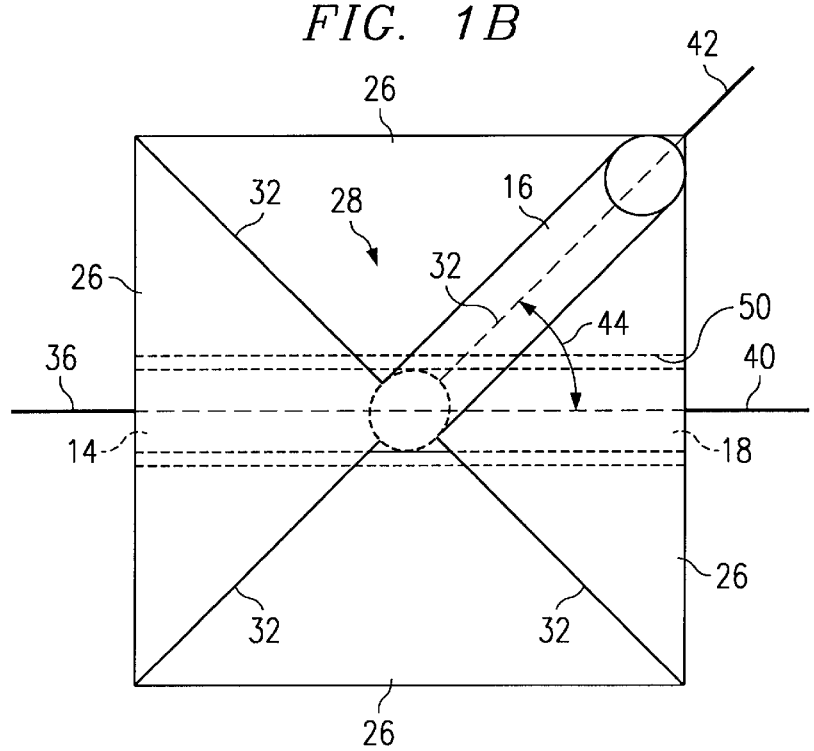
FIG. 1B is a diagrammatic bottom view of the optical switch of FIG. 1A.

FIGS. 1A and 1B are respectively a diagrammatic side view and a diagrammatic bottom view of one embodiment of an optical switch 10 that includes an aligning member 12, an input waveguide 14, a first output waveguide 16, and a second output waveguide 18. In general, aligning member 12 positions the waveguides 14, 16, and 18 with respect to each other. Optical switch 10 receives an optical signal 20 through the input waveguide 14, and selectively communicates the signal 20 to a selected one of the waveguide 16 and the waveguide 18, based on the position of waveguide 18, as discussed later. In this regard, FIG. 1 illustrates a 1×2 optical switch, where a signal from one input can be selectively directed to either of two outputs.

Aligning member 12 includes a first or top surface 22, and a second or bottom surface 24, and has therein an aperture 28 defined by a plurality of interior faces 26. The aperture 28 extends from the first surface 22 to the second surface 24. In the disclosed embodiment, aperture 28 is formed as a pyramid of four sides, oriented so that the apex is at or in the region of the first surface 22. In the embodiment of FIGS. 1A and 1B, aperture 28 is shown with a rectangular base, but it will be understood that the present invention contemplates any other suitable shape.

Figure 2:
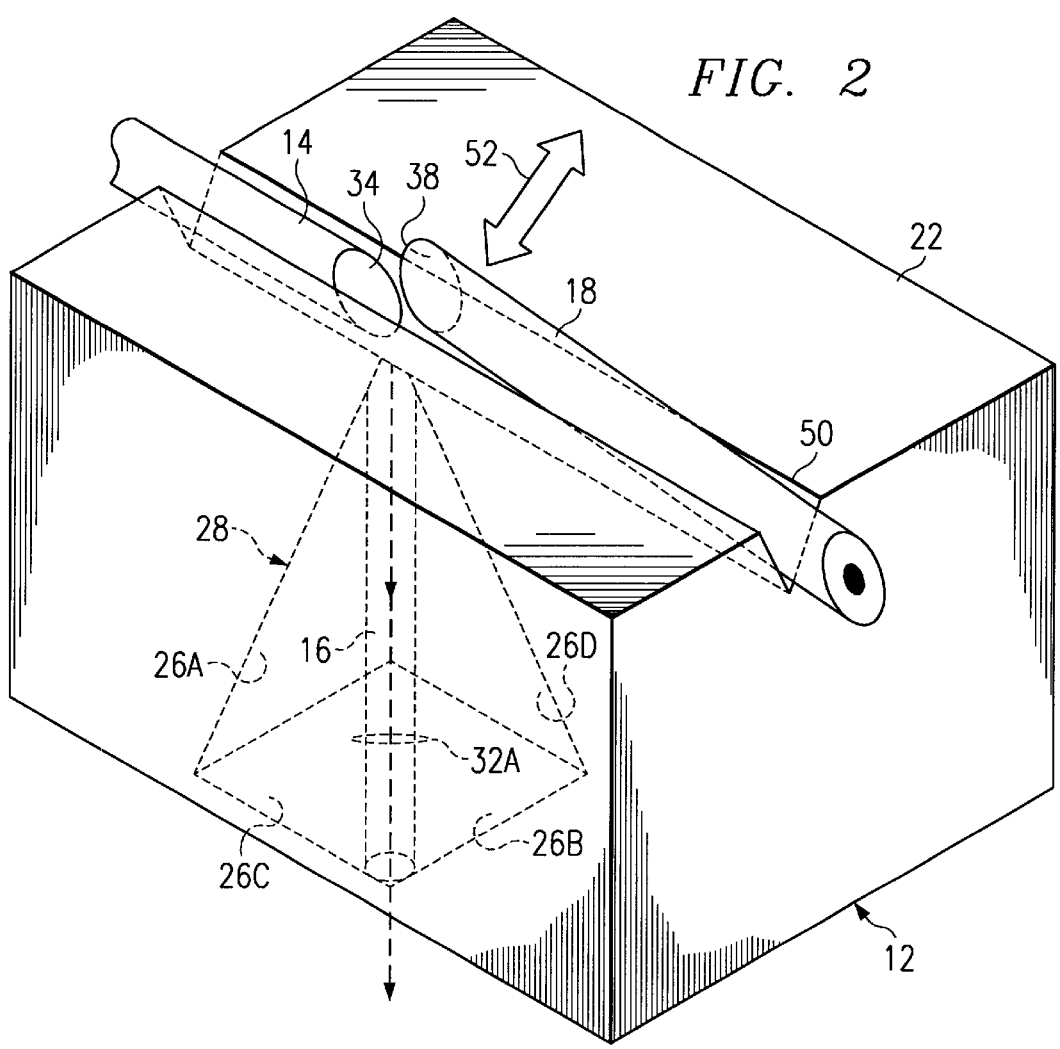
FIG. 2 is a diagrammatic perspective view of the optical switch of FIG. 1A.

Aligning member 12 also includes four aligning grooves 32, which are each formed by the intersection of a respective pair of the interior faces 26, as illustrated in greater detail in FIG. 2, which is a diagrammatic perspective view of the optical switch 10 of FIG. 1A.

The waveguides 14, 16 and 18 are each an optical waveguide formed by any arrangement of suitable optically transmissive material that can communicate the optical signal 20 as a guided wave of energy. In the disclosed embodiment, the waveguides 14, 16 and 18 are each an optical fiber (referred to generally as input optical fiber 14, and output optical fibers 16 and 18). Each of these optical fibers includes a core designed to transmit or receive information in the form of light pulses, and a cladding that surrounds the core to prevent signal 20 from escaping the core during transmission. Optical signal 20 may include any or all of visible light, infrared radiation, ultra-violet radiation, or any other suitable optical beam operating at any suitable wavelength.

Each core of the optical fibers 14–18 includes a suitable refractive material having a particular index of refraction. Each cladding of the optical fibers 14–18 includes a suitable refractive material having an index of refraction lower than that of the corresponding core, such that signal 20 in the core cannot enter the cladding and thus propagates along the longitudinal axis of the core. The optical fibers 14–18 may each be either a multi-mode fiber having a large core (e.g. 50 or 62.5 microns wide) or a single mode fiber having a small core (e.g. 9 microns wide). In the disclosed embodiment, the fibers 14–18 are each disclosed as having a circular cross-section, but it will be understood that the cross-section of optical fibers 14–18 could alternatively have any other suitable shape, including but not limited to an oval, or a circle having grooves or notches.

Fiber 14 includes a reflection surface 34 arranged at a bias angle with respect to a reference plane that is perpendicular to the longitudinal axis 36 of the fiber 14. The longitudinal axis 36 may also be referred to as input axis 36. Although the surface 34 is referred to herein as a reflection surface, it should be understood that, as explained in more detail later, the switch 10 has a first operational mode in which the surface 34 reflects optical signals, and has a second operational mode in which the surface 34 does not reflect optical signals.

The first output fiber 16 is stationarily positioned in one of the aligning grooves 32 of the aligning member 12, such that the fiber 16 receives the optical signal 20 when the signal is totally internally reflected by the reflection surface 34 of input fiber 14. Therefore, first output fiber 16 may be referred to as the total internal reflection (TIR) fiber 16. The index of refraction of the core of fiber 16 is substantially the same as that of the core of input fiber 14. The direction of propagation of optical signals 20 through the TIR fiber 16 generally defines a TIR axis 42, which is the central longitudinal axis of TIR fiber 16. The fiber 16 is fixedly secured in the groove 32 by a known adhesive, or in some other suitable manner known to persons skilled in the art.

The second output fiber 18 includes a contact surface 38 arranged at a bias angle with respect to a plane that is perpendicular to the longitudinal axis 40 of the fiber 18. The index of refraction of the core of fiber 18 is substantially the same as that of the core of input fiber 14. The fiber 18 can be flexed so that the end thereof near fiber 14 moves transversely with respect to the axis 40, between a first position in which the contact surface 38 is spaced apart from the reflection surface 34 of the fiber 14, and a second position in which the contact surface 38 is in proximal contact with the reflection surface 34 of fiber 14.

When the surfaces 34 and 38 are in proximal contact, total internal reflection of the optical signal 20 by the reflection surface 34 is frustrated, such that the optical signal 20 travels from the input fiber 14 through the surfaces 34 and 38, and into the output fiber 18. When the surfaces 34 and 38 are out of proximal contact, reflection surface 34 of fiber 14 effects total internal reflection of the optical signal 20, so that the optical signal 20 traveling through input fiber 14 is reflected by the surface 34 in a manner directing it into and through the output fiber 16. Therefore, fiber 18 may be referred to as the frustrated total internal reflection (FTIR) fiber 18, and longitudinal axis 40 may be referred to as the FTIR axis 40.

Although the input fiber 14 and the output fiber 18 have been described herein as separate waveguides, the input fiber 14 and output fiber 18 can alternatively be viewed as respective sections of a single optical waveguide. In that case, the end portions of the fibers 14 and 18 which have the surfaces 34 and 38 may together be considered to be a switching portion 30 of the optical switch 10.

As used herein, the term "proximal contact" refers not only to direct contact between the surfaces on the fibers 14 and 18, but also contemplates any spacing or partial contact between these surfaces which is sufficient to frustrate the total internal reflection of optical signal 20 to a desired degree. By controlling the spacing between the fibers 14 and 18 to a desired degree, the optical switch 10 may perform a beam-splitting or variable attenuation operation, such that a desired portion of the signal 20 is communicated to the fiber 18 and the remaining portion of the signal 20 is communicated to the fiber 16. In the disclosed embodiment, the reflection surface 34 of fiber 14 is substantially parallel to the contact surface 38 of fiber 18 when these surfaces are in proximal contact, such that the longitudinal axis of fiber 14 is substantially co-axially aligned with the longitudinal axis of fiber 18.

The aligning member 12 has a V-shaped groove 50 in the first surface 22 thereof. The lower portion of the groove 50 intersects the upper portion of the aperture 28, so that they are in communication.

The aligning groove 32 of the aligning member 12 receives the TIR fiber 16, and serves to position the TIR fiber 16 at an appropriate angle with respect to the input fiber 14, such that TIR fiber 16 receives optical signals 20 which are totally internally reflected by the surface 34 of the fiber 14. Input fiber 14 and FTIR fiber 18 are preferably positioned in the V-shaped groove 50 of the aligning member 12 so that the input axis 36 and the FTIR axis 40 both lie below a plane defined by the first surface 22. The groove 50 and aperture 28 are positioned with respect to each other so that the input axis 36, the output axis 40, and the output axis 42 all lie in a common plane. Contact surface 38 of FTIR fiber 18 can move into and out of proximal contact with the reflection surface 34 of input fiber 14 through flexing of fiber 18, in a manner which causes the end with surface 38 to move partially out of the groove 50 (FIG. 2), and then back into the groove 50 (FIG. 1A), as discussed later. The fibers 14 and 18 are fixedly secured in the groove 50 by a known adhesive, except for the movable end of fiber 18 which has the surface 38. Instead of an adhesive, the fibers 14 and 18 can be secured in position by some other suitable technique known to those skilled in the art.

With the fibers 14–18 supported on the member 12 in this manner, the input axis 36, the FTIR axis 40 and the TIR axis 42 have an established angular relationship to one another. For example, the angular position of TIR axis 42 relative to the input axis 36 can be described as an angle of rotation within the plane of first surface 22 plus an angle of rotation out of the plane of first surface 22. The angle within the plane is represented by an azimuth angle 44 (shown in FIG. 1B), while the angle out of the plane is represented by a declination angle 46 (shown in FIG. 1A).

Angle 46 is formed by the intersection of the FTIR axis 40 with the projection of the TIR axis 42 onto a plane which is perpendicular to the first surface 22 and which contains FTIR axis 40. Qualitatively, angle 46 represents how steeply the TIR fiber 16 is positioned with respect to the first surface 22 of the aligning member 12, and is generally determined by the steepness of the interior faces 26 of the aligning member 12. In the disclosed embodiment, the bias angle of the reflection surface 34 of fiber 14 is determined on the basis of angle 46 so that a totally internally reflected signal 20 is directed into the fiber 16.

Referring now to FIG. 1B, angle 44 is formed by the intersection of the FTIR axis 40 and the projection of the TIR axis 42 onto the plane of the first surface 22. Qualitatively, angle 44 represents how steeply the TIR fiber 16 is positioned with respect to one side or the other of input fiber 14 and/or FTIR fiber 18. In this manner, angles 44 and 46 describe the position of the TIR fiber 16 with respect to the input fiber 14 and/or the FTIR fiber 18.

Referring now to FIG. 2, the four interior faces 26 of the member 12 are respectively identified as 26A, 26B, 26C and 26D. The interior faces 26B and 26C intersect to form the aligning groove 32 that receives and aligns the TIR fiber 16 in the appropriate position.

Switch 10 further includes an actuator, which is shown diagrammatically by a double-headed arrow at 52. Suitable actuators are known in the art, and the actuator 52 is therefore not illustrated and described here in greater detail. The actuator 52 may, for example, be a piezoelectric device, a bimorph transducer, or any other suitable device that can move the end of fiber 18 between its two positions in response to an electrical, thermal, or other appropriate control signal. Activating and deactivating the actuator 52 therefore brings the surface 38 on the FTIR fiber 18 into and out of proximal contact with the surface 34 on the input fiber 14.

In the disclosed embodiment, the aligning member 12 of the optical switch 10 is formed by anisotropically wet-etching a piece of silicon in order to form the aperture 28 with the plural interior faces 26, which extends from the first surface 22 to the second surface 24. In more detail, the aligning member 12 in the disclosed embodiment is a silicon wafer that can be anisotropically etched with a high degree of precision to form structures having features that correspond to those of a silicon lattice. More specifically, with reference to FIG. 2, the first surface 22 and the second surface 24 each correspond to a respective (100) face of a silicon crystal. The aperture 28, which has the shape of a pyramid, is formed by anisotropically etching into the second surface 24 of the aligning member 12 a square whose sides are initially about 1.414 times the thickness of the (100) silicon material of member 12. As etching proceeds into the wafer, the crystalline structure of the wafer causes the size of the square to progressively decrease, until the wafer is eventually etched most or all of the way through. The aperture 28 has an apex at or close to the first surface 22. The aperture 28 formed by this anisotropic etching process has the pyramid shape described above, with the four interior faces 26A–26D. Each adjacent pair of the faces 26 intersect to form a respective one of the grooves 32, the faces forming an angle which is described in greater detail with reference to FIG. 3.

Figure 3:
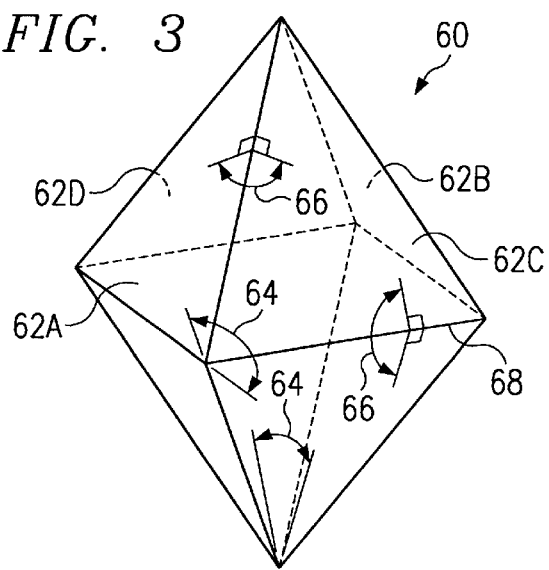
FIG. 3 is a diagrammatic perspective view of a crystalline octahedron formed by the intersection of the (111) planes of a silicon member.

FIG. 3 illustrates in detail the lattice structure of the silicon material that is used to fabricate the aligning member 12, in particular by depicting an octahedron 60 having exterior surfaces defined by the intersection of (111) planes of the silicon material. Octahedron 60 includes faces 62A–62D that correspond to the interior faces 26A–26D of the aperture 28 (FIG. 2). At each of the vertices of the octahedron 60, the faces 62 on opposite sides of the octahedron form an angle 64 at the vertex which, in the disclosed embodiment, is 70.53°. Along each of the edges of the octahedron, the faces 62 which meet to form that edge form an angle 66 which, in the disclosed embodiment, is equal to the tetrahedral bond angle of 109.47°. The central rectangle 68 lies in a plane parallel to the (100) plane of silicon.

Anisotropic etching of a (100) face of silicon, as described with reference to FIG. 2, forms features corresponding to features of the (111) octahedron 60 in FIG. 3. In particular, anisotropic etching of a (100) face of silicon forms an aperture 28 (FIG. 2) having a plurality of interior faces 26 that correspond to respective faces 62 (FIG. 3) of the octahedron 60. The intersection of each pair of adjacent faces 26 (FIG. 2) forms an aligning groove 32 having an angle corresponding to the angle 66 (FIG. 3) of octahedron 60. Groove 50 (FIG. 2) is also etched into the aligning member 12 using anisotropic etching techniques, and its side surfaces correspond to respective faces 62 (FIG. 3) of the octahedron 60.

Figure 4A:
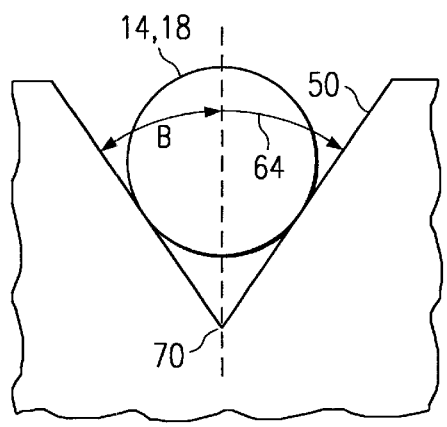
FIG. 4A is a diagrammatic fragmentary view of a portion of the optical switch of FIG. 1A, showing how a waveguide is positioned within a groove.
Figure 4B:
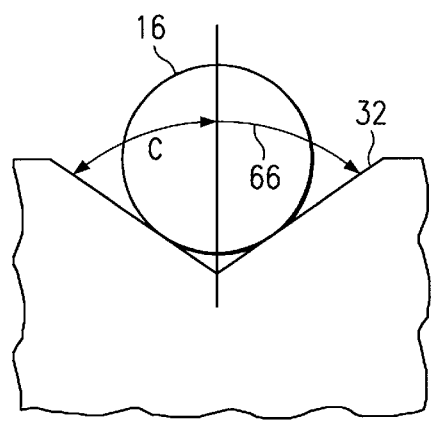
FIG. 4B is a diagrammatic fragmentary view of a portion of the optical switch of FIG. 1A which is different from the portion depicted in FIG. 4A, and shows how a further waveguide is positioned within a further groove.

Because the groove 50 and the aligning grooves 32 are formed by anisotropic etching, the angles of the grooves correspond to respective angles in the silicon lattice. These angles are illustrated in FIGS. 4A and 4B. Referring to FIG. 4A, the V-shaped groove 50 has an acute angle 64, which is the same as the angle 64 of the octahedron 60 in FIG. 3. Referring to FIG. 4B, each V-shaped aligning groove 32 has an obtuse angle 66, which is the same as the angle 66 of the octahedron 60 in FIG. 3.

A technical advantage of anisotropically etching a silicon material is that it consistently produces the appropriate aligning grooves 32 of aligning member 12 that are in an accurate predetermined angular relationship with respect to the groove 50, due to the lattice structure of silicon. This relationship determines both the azimuth angle 44 and the declination angle 46 of the TIR fiber 16.

In order to exploit the fixed angular relationship between the aligning groove 32 and the groove 50, fibers 14–18 are constructed and positioned in a particular way. For example, the reflection surface 34 of input fiber 14 is angled so that, when fiber 18 is spaced apart from fiber 14, reflection surface 34 of fiber 14 totally internally reflects an optical signal 20 propagating within input fiber 14, the reflected radiation traveling along a line which is coaxial with the longitudinal axis 42 of the TIR fiber 16. In order for this to occur, the reflection surface 34 must be perpendicular to a plane which contains each of the longitudinal axes 36 and 42, and must also form the same angle with respect to each of the longitudinal axes 36 and 42.

This bias angle for the reflection surface 34 of the fiber 14 can also be determined mathematically, as a function of the azimuth angle 44 and the declination angle 46, using vector algebra and Snell's law. In the disclosed embodiment, of course, the longitudinal axis 42 does not extend vertically. Consequently, the above-mentioned plane that contains both of the axes 36 and 42 forms an angle relative to a vertical plane that contains the longitudinal axis 42. This angle is referred to herein as the "twist" angle of the fiber, because it indicates how far the input fiber 14 would have to be rotated about its longitudinal axis 42 in order to reposition it so that incident and reflected radiation associated with the reflection surface 34 would both lie in a plane which is vertical. Since the surface 38 on the FTIR output fiber 18 needs to be parallel to the surface 34 when they are adjacent, it will be recognized that the FTIR fiber 18 has the same twist angle as the input fiber 14.

In the disclosed embodiment, the twist angle for each of the fibers 14 and 18 is approximately 35.26°. The actual twist angle in a given switch can be measured by one or more interferometric techniques, in order verify that the input fiber 14 has been properly positioned in the groove 50. With this twist angle, the axis 42 forms an angle of exactly 120° with respect to the axis 36, so that the surface 34 has a bias angle of exactly 30° with respect to the axis 36. In other words, the surface 34 has a 60° polish from normal, which means that it forms an angle of 60° with respect to a plane perpendicular to the axis 36.

The TIR fiber 16 is positioned in the groove 32A such that total internal reflection at reflection surface 34 of fiber 14 directs the optical signal 20 into the TIR fiber 16. When the surface 38 of FTIR fiber 18 is placed in proximal contact with the surface 34 of input fiber 14, FTIR fiber 18 frustrates the total internal reflection of signal 20, as a result of which the fiber 18, which is aligned with fiber 14 by groove 50, receives the non-reflected optical signal 20.

A technical advantage of the anisotropically etched silicon aligning member 12 is that the twist angle of the fiber 14 is generally half of the acute angle 64 of the groove 50. As a result, actuation of the FTIR fiber 18 can take place by flexing the end to slide against one of the side walls of the groove 50, thereby avoiding the need for separate guide structure for the fiber 18, while making the actuation process more robust.

Although the disclosed embodiment uses a silicon aligning member 12, it will be understood that the techniques described herein are adaptable to any crystalline substance with a known lattice structure that is amenable to anisotropic etching. It is further understood that the specific angles described herein are those appropriate for the disclosed embodiment, and that bias and twist angles for the fiber 14 can have other values in other embodiments, particularly where the aligning member is made from a material other than silicon which has different angles in its crystalline structure.

Figure 6:
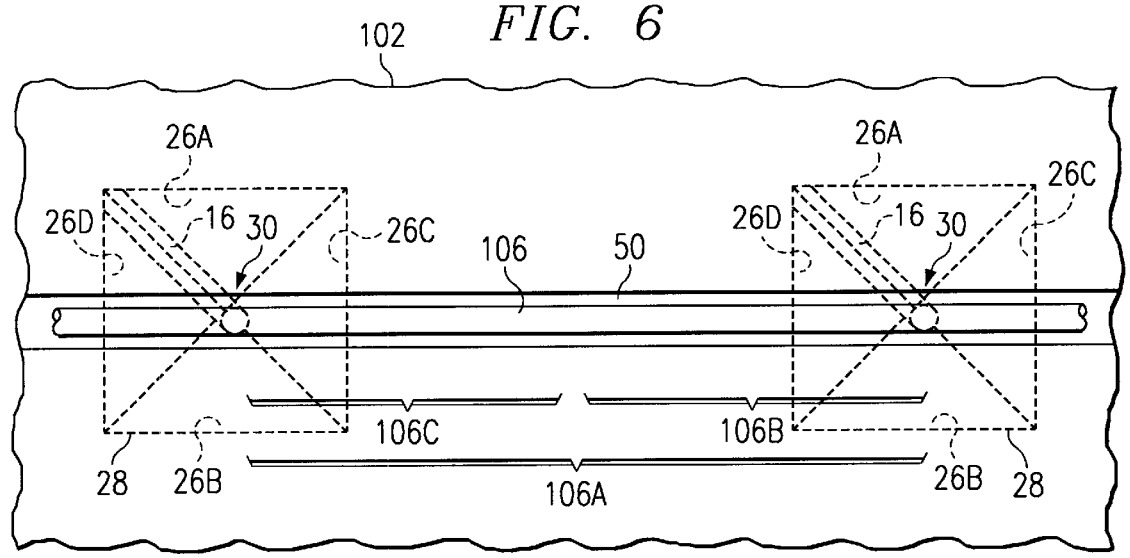
FIG. 6 is a diagrammatic view in an enlarged scale of a portion of the optical switch fabric of FIG. 5.
Figure 5:
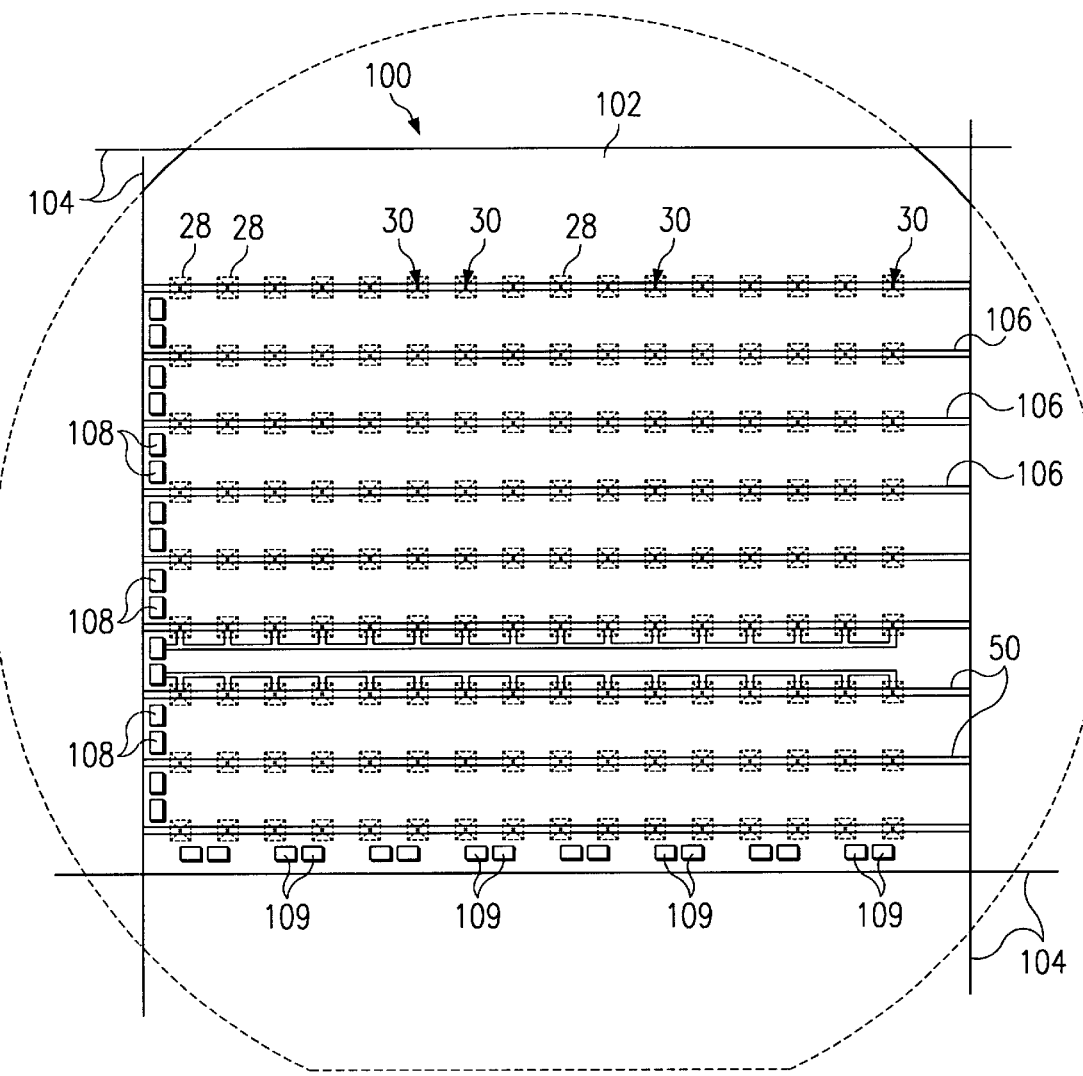
FIG. 5 is a diagrammatic top view of an optical switch fabric which includes a plurality of optical switches of the type shown in FIG. 1A.

A technical advantage of the configurations described above is that they are adaptable to wafer processing techniques, such that multiple optical switches of the type discussed above can be fabricated in a single wafer. These may be functionally separate switches, or they may be functionally interrelated. As one example of functionally interrelated switches, it is possible to create a 1×N switch array having N-1 optical switches 10, so as to allow an optical signal at one input to be selectively directed to any one of N outputs. FIGS. 5 and 6 illustrate one embodiment of such a switch fabric which is a 1×N switch fabric.

More specifically, FIG. 5 is a diagrammatic top view of an optical switch fabric 100 having nine 1×17 optical switches, and FIG. 6 is a diagrammatic top view, in an enlarged scale, of a portion of the switch fabric 100. The switch fabric 100 includes an aligning member 102 that is a rectangular section cut from a generally round wafer of (100) silicon. In particular, the wafer is indicated by broken lines in FIG. 5, and the aligning member 102 is cut from it along four saw paths 104. The approximately square aligning member 102 may be configured to have a diagonal dimension of approximately 100 mm, in order to exploit the fact that silicon wafers are often manufactured with a diameter of 100 mm. However, it will be recognized that in principle the wafer 102 could be larger or smaller, and that the aligning member 102 could be correspondingly scaled, without deviating from the scope of the present invention. Further, it would be possible to obtain several separate aligning members 102 from a single wafer.

In FIG. 5, the aligning member 102 has a plurality of pyramid-shaped apertures 28 etched therein, and the apertures 28 are arranged in an array of M rows and N-1 columns. Each row in FIG. 5 corresponds to a respective 1×N switch array. The aligning member 102 has a plurality of parallel V-shaped grooves 50 etched into the top surface thereof, each of which extends above and communicates with the apertures 28 of a respective row. The switch fabric 100 has a plurality of parallel waveguides 106, which are each disposed in a respective groove 50. Each waveguide 106 includes a plurality of successive sections along the length thereof, the ends of these sections each being disposed in the region of a respective aperture 28, or else at the left or right side of the aligning member 102.

For example, as shown in more detail in FIG. 6, one of the waveguides 106 has a section 106A which extends between two apertures 28, and which has two portions 106B and 106C. The portion 106B is an anchored portion that is bonded to the groove 50, and the portion 106C is not bonded within the groove 50 and is thus free to flex, in a manner similar to that described above for the embodiment of FIGS. 1–4. The portion 106B has at its outer end a reflection surface which is equivalent to the reflection surface 34 that was described above in association with FIG. 2, and the portion 106C has at its outer end a contact surface which is equivalent to the contact surface 38 that was also described above in association with FIG. 2. Consequently, along the length thereof, each waveguide 106 has a plurality of switching portions 30, each of which is disposed above a respective one of the apertures 28. Stated differently, each of the apertures 28 has above it a respective one of the switching portions 30 of a respective one of the waveguides 106.

The apertures 28 each have an aligning groove 32, and the grooves 32 each have a respective TIR fiber 16 disposed therein, in manner similar to that described above for the embodiment of FIGS. 1–4. Thus, in association with each of the apertures 28, the switch fabric 100 includes a respective optical switch which is similar to the optical switch 10 of FIGS. 1–4, and which includes a respective one of the switching portions 30. Each such switch has a respective actuator which is not illustrated in FIGS. 5–6 for clarity, but which is equivalent to the actuator 52 discussed above for the embodiment of FIGS. 1–4. Each of these actuators effects flexing of the portion 106C of an associated section of a corresponding fiber 106, in a manner similar to that described above for the embodiment of FIGS. 1–4.

With reference to FIG. 5, the semiconductor aligning member 102 has several bond pads 108 and 109 to which external circuitry can be coupled to facilitate the addressing or selection of the actuators. In particular, the bond pads 108 along the left side of the aligning member 102 in FIG. 5 facilitate selection of actuators in a direction along the rows of the array, and the bond pads 109 along the lower side of the aligning member 102 in FIG. 5 facilitate selection of actuators in a direction along the columns of the array. A technical advantage of the switch fabric 100 of FIG. 5 is the fact that the spacing of the apertures on the wafer 102 allows for convenient placement of the bond pads 108 and 109.

When an optical signal is introduced into one of the waveguides 106, for example at the left end thereof in FIGS. 5–6, the optical signal travels through that waveguide 106 until it encounters one of the switching portions 30 in which the reflection and contact surfaces are spaced, thereby causing the optical signal to be totally internally reflected at that reflection surface, so that the optical signal is directed into the associated TIR fiber 16. If each of the switching portions 30 along the entire length of that particular waveguide 106 happens to currently have the reflection and contact surfaces thereof disposed adjacent each other, then the optical signal will propagate all the way through the entire waveguide 106, and will exit the waveguide 106 at the right end thereof in FIG. 5, without being directed into any of the associated TIR fibers 16. That is, the left end of the waveguide 106 serves as an input, and the right end of the waveguide and also the N−1 associated TIR fibers serve as respective outputs, thereby defining a 1×N switch in association with each waveguide 106.

It should be noted that, even though fibers are flexed in order to effect routing of optical signals, radiation never has to pass through a flexed fiber, since flexing of a fiber causes the radiation to always be reflected into a different fiber before it reaches the flexed fiber. Consequently, the disclosed embodiments do not cause the radiation to experience any losses of the type that can occur when radiation has to pass through a fiber which is flexed.

Figure 7:
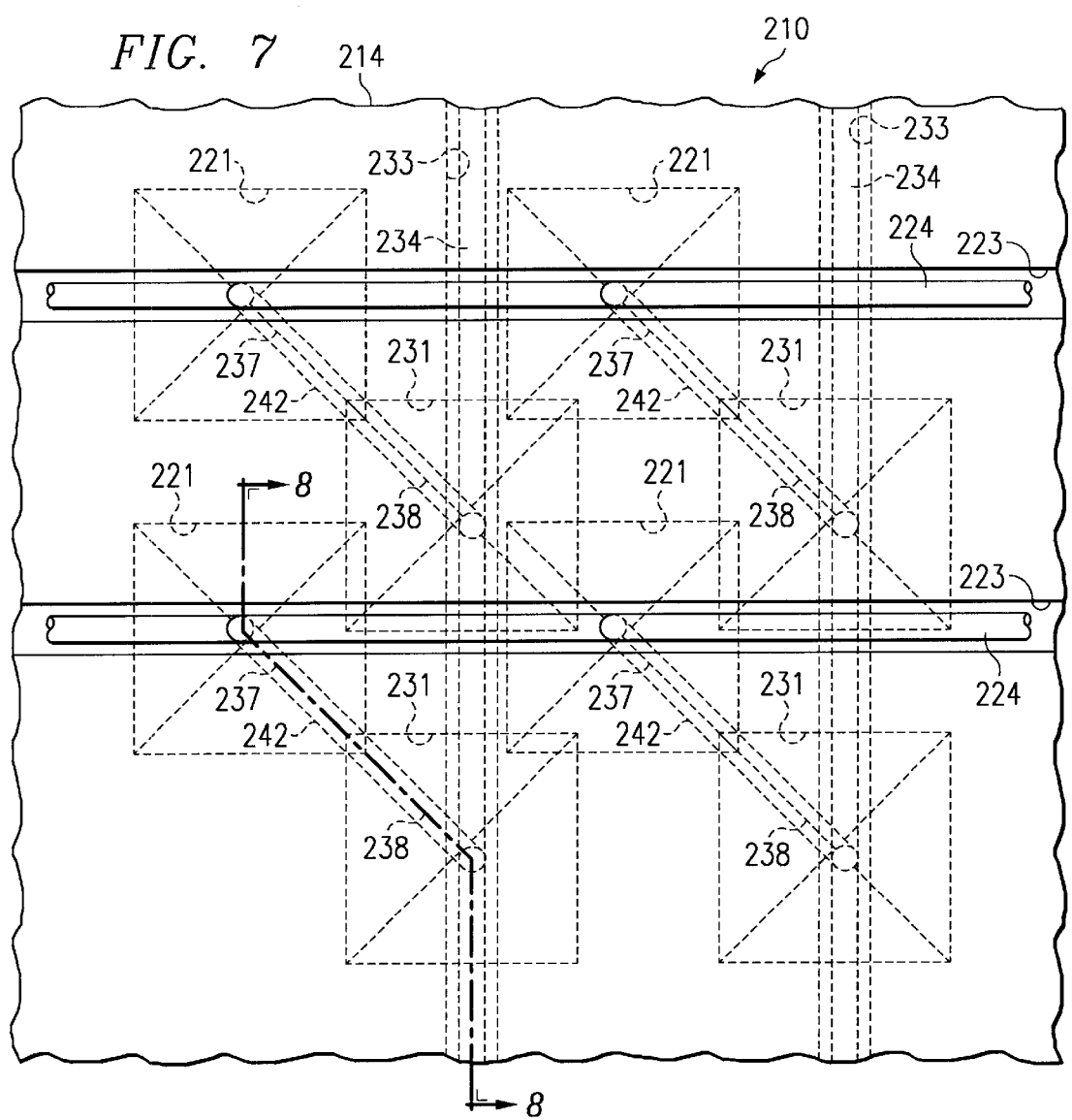
FIG. 7 is a diagrammatic top view of yet another embodiment of an optical switch fabric which embodies the present invention, and which includes two switch fabrics of the type shown in FIG. 5 that cooperate with each other.
Figure 8:
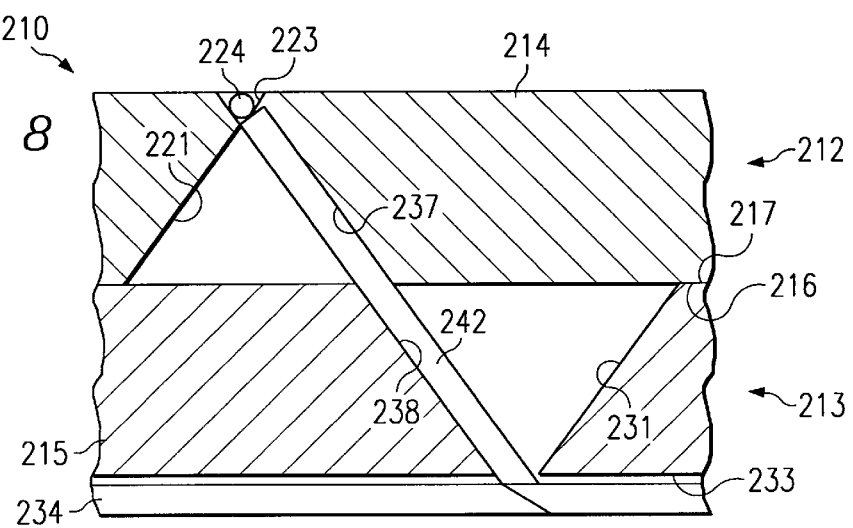
FIG. 8 is a diagrammatic sectional view of the switch fabric of FIG. 7, taken along the line 8—8 in FIG. 7.

FIG. 7 is a diagrammatic top view of a switch fabric 210 which is yet another alternative embodiment of the present invention. FIG. 8 is a diagrammatic sectional view taken along the line 8—8 in FIG. 7. The switch fabric 210 includes two cooperating switch fabrics of the type discussed above in association with FIGS. 5–6, one of which is designated generally in FIG. 8 by reference numeral 212, and the other of which is designed generally in FIG. 8 by reference numeral 213. Since the switch fabrics 212 and 213 each have a structure which is effectively the same as the structure of the switch fabric 100 of FIGS. 5–6, the switch fabrics 212 and 213 are each discussed only briefly.

In particular, with reference to FIG. 8, the switch fabrics 212 and 213 include respective aligning members 214 and 215 arranged in a back-to-back relationship. More specifically, the aligning members 214 and 215 have respective bottom surfaces 216 and 217 that engage each other and are fixedly bonded together using a known adhesive, or using some other suitable technique known to persons skilled in the art. The aligning member 214 has four pyramid-shaped apertures 221 therein which are arranged to form a 2×2 array, where each aperture 221 has a base at the bottom surface 216, and tapers progressively in size in a direction away from the bottom surface 216. The aligning member 214 also has, in a surface on a side thereof opposite from the bottom surface 216, two parallel V-shaped grooves 223, which each communicate with the two apertures 221 in a respective one of the two rows of apertures. Each of the grooves 223 has therein a waveguide 224. The waveguides 224 are each similar to the waveguides 106 discussed above in association with FIGS. 5–6, one aspect of which is the fact that the waveguides 224 each include a plurality of sections. Each aperture 221 has associated with it a respective, not-illustrated actuator which is equivalent to the actuator 52 discussed above in association with the embodiment of FIGS. 1–4.

In a similar manner, the other aligning member 215 has four pyramid-shaped apertures 231 which are arranged in a 2×2 array, where each aperture 231 has a base disposed at the bottom surface 217 and tapers progressively in size in a direction away from the bottom surface 217. Further, the aligning member 215 has two parallel V-shaped grooves 233 in a surface which is on a side thereof remote from the bottom surface 217. The grooves 233 each receive a respective one of two waveguides 234, which are equivalent in structure and function to the waveguides 106 discussed above in association with the embodiment of FIGS. 5–6, one aspect of which is that they each have multiple sections. Each aperture 231 has associated with it a respective, not-illustrated actuator which is equivalent to the actuator 52 discussed above in association with the embodiment of FIGS. 1–4.

As evident from the top view of FIG. 7, the grooves 233 and the waveguides 234 each extend substantially perpendicular to the grooves 223 and the waveguides 224. This is achieved by orienting the switch fabric 213 at an angle of 90° with respect to the similar switch fabric 212, in relation to an imaginary axis extending perpendicular to the bottom surfaces 216 and 217.

Each of the apertures 221 in the aligning member 214 defines an aligning groove 237 which is equivalent to the aligning groove 32 discussed above in association with the apertures 28 in the embodiment of FIGS. 1–4. Similarly, each of the apertures 231 defines an aligning groove 238. The aligning members 214 and 215 are positioned with respect to each other so that the square base of each aperture 221 in the member 214 has a corner portion which overlaps a corner portion of the square base of a respective one of the apertures 231 in the member 215. The overlapping corner portions are at the corners which respectively correspond to the groove 237 in the aperture 221 and the groove 238 in the aperture 231. Each groove 237 thus extends parallel to the associated groove 238, and has a predetermined alignment with respect to it.

The switch fabric 210 includes four intermediate waveguides 242 which are each an optical fiber, and which are each received in a respective pair of the grooves 237 and 238. The amount of overlap between the base of each aperture 221 and the base of the associated aperture 231 is just large enough to permit the associated intermediate fiber 242 to extend therethrough. In other words, the overlap area is a square having sides with a dimension substantially equal to the diameter of the associated intermediate fiber 242. Each intermediate fiber 242 is, in a sense, a double-ended version of the TIR output fiber 16 in the above-discussed embodiment of FIGS. 1–4. In particular, each end of the intermediate fiber 242 corresponds generally in structure and function to the upper end of the fiber 16 as seen in FIG. 1A.

In the embodiment disclosed in FIG. 7, the left ends of the waveguides 224 constitute the inputs to the switch fabric 210, and the right ends of the waveguides 224 and also the lower ends of the waveguides 234 constitute the outputs of the switch fabric 210. When an optical signal enters the switch fabric 210 from the left end of either one of the waveguides 224, that signal can be selectively routed to either one of the two waveguides 234 through a respective one of the intermediate waveguides 242, or can alternatively be routed to the right end of that same waveguide 224. Stated differently, an optical signal introduced into the left end of any waveguide 224 in FIG. 7 can be selectively routed to the right end of the same waveguide 224, or alternatively to any of the waveguides 234. Although the embodiment disclosed in FIGS. 7–8 has two of the waveguides 224 and two of the waveguides 234, it will be recognized that either of these two groups of waveguides could include a larger or smaller number of waveguides.

As evident from the foregoing discussion, when the switch portion at one end of any intermediate waveguide 242 is actuated, the switch portion at the opposite end of that intermediate waveguide is also actuated. When both such switches are actuated, the respective reflection surfaces thereof, which are adjacent opposite ends of the intermediate waveguide 242, can route radiation traveling within the associated waveguide 224 through the intermediate waveguide 242 to the associated waveguide 234, and can also route radiation traveling in the opposite direction within the associated waveguide 234 through the intermediate waveguide 242 to the associated waveguide 224. In other words, the switch fabric 210 of FIGS. 7–8 supports two-way data communications through the optical paths which can be established. If a switch fabric of the type shown in FIGS. 7–8 had four of the waveguides 224 and four of the waveguides 234, the number of possible ways in which each of the waveguides 224 can be coupled to a respective one of the waveguides 234 is:

$$4! = 4 \times 3 \times 2 \times 1 = 24.$$

Depending on the specific features implemented, various embodiments of the present invention may exhibit some, none, or all of the following technical advantages. One aspect of the present invention provides an aligning member that includes a silicon wafer, or some other suitable material, that can be anisotropically etched with a high degree of precision to form a structure having features corresponding to those of a crystalline lattice. One aspect of the resulting structure is an aperture formed by interior faces of the aligning member. The intersection of two adjacent interior faces forms an aligning groove that can position an output waveguide such that the output waveguide can receive an optical signal from an input waveguide positioned near a first surface of the aligning member. In addition, the first surface of the aligning member can further position another output waveguide to form a 1×N optical switch.

A related advantage is that two such aligning members can be coupled together so that they share intermediate TIR waveguides disposed in the apertures, and so that the other waveguides of one extend generally perpendicular to the other waveguides of the other. This configuration results in an M×N switch matrix, in which an optical at any of the M inputs can be selectively routed to any of N outputs.

A particular advantage of anisotropically etching a material having a crystalline lattice structure, such as silicon, is that it consistently and accurately produces grooves and apertures having surfaces with precisely the proper orientation. In this manner, an accurate and repeatable aligning member for an optical switch may be manufactured in a cost-effective manner. Although several embodiments of the invention have been described in detail, a variety of changes, variations, alterations, transformations, and modifications may be made without departing from the spirit and scope of the present invention, as set forth in the following claims.

What is claimed is:
1. An apparatus, comprising:
a first aligning member having first and second sides, and having a first aperture which extends between and opens through each of said first and second sides thereof, said first aperture having therein a first groove which extends between said first and second sides of said first aligning member;
a second aligning member. having first and second sides, and having a second aperture which extends between and opens through each of said first and second sides thereof, said second aperture having therein a second groove which extends between said first and second sides of said second aligning member, said first and second aligning members being fixedly coupled to each other with said second side of said second aligning member disposed adjacent said second side of said first aligning member in a manner so that said first groove in said first aperture extends substantially parallel to and has a predetermined alignment with respect to said second groove in said second aperture;
a first waveguide which is positioned against said first side of said first aligning member, and which includes two first sections arranged in an end-to-end relationship, the adjacent ends of said first sections forming a first switching portion which is disposed adjacent an end of said first aperture and has one of said ends therein supported for movement between first and second positions respectively adjacent and spaced from the other of said ends therein;
a second waveguide which is positioned against said first side of said second aligning member, and which includes two second sections arranged in an end-to-end relationship, the adjacent ends of said second sections forming a second switching portion which is disposed adjacent an end of said second aperture and has one of said ends therein supported for movement between first and second positions respectively adjacent and spaced from the other of said ends therein; and
a third waveguide which is disposed in said first and second grooves, said third waveguide having opposite ends which are respectively disposed adjacent said other end in said first switching portion and said other end in said second switching portion;
wherein when said one end in each of said first and second switching portions is respectively in said first and second positions thereof, that switching portion respectively establishes a first optical path in which radiation travels between said one end and said other end therein exclusive of said third waveguide, and a second optical path in which radiation travels between said other end therein and said third waveguide exclusive of said one end therein.

2. An apparatus according to claim 1, wherein said second waveguide extends approximately parallel to a plane which is perpendicular to said first waveguide.

3. An apparatus according to claim 2, wherein said third waveguide forms an acute angle with respect to each of said first and second waveguides.

4. An apparatus according to claim 1,
wherein said first aperture has therein a plurality of interior surfaces arranged to give said first aperture approximately the shape of a pyramid that has a base at said second side of said first aligning member and that tapers progressively in cross-sectional size from said second side toward said first side of said first aligning member, said first groove being defined by the intersection of two of said interior surfaces of said first aperture; and wherein said second aperture has therein a plurality of interior surfaces arranged to give said second aperture approximately the shape of a pyramid that has a base at said second side of said second aligning member and that tapers progressively in cross-sectional area from said second side toward said first side of said second aligning member, said second groove being defined by the intersection of two of said interior surfaces of said second aperture.

5. An apparatus according to claim 4, wherein said first and second aligning members are each made of an etchable material which has a crystalline lattice, said interior surfaces of said first and second apertures each corresponding to a respective plane of said crystalline lattice.

6. An apparatus according to claim 5, wherein said first aligning member has on said first side thereof a third groove which communicates with said first aperture, which has said first waveguide supported therein, and which has two intersecting surfaces that each correspond to a respective plane of said crystalline lattice; and wherein said second aligning member has on said first side thereof a fourth groove which communicates with said second aperture, which has said second waveguide supported therein, and which has two intersecting surfaces that each correspond to a respective plane of said crystalline lattice.

7. An apparatus according to claim 6, wherein said first and second aligning members each have parallel first and second surfaces which are respectively provided on said first and second sides thereof, said second surfaces being in engagement and being bonded to each other to effect said fixed coupling of said first and second aligning members, said first surfaces each having a respective one of said third and fourth grooves therein, and said first and second surfaces each corresponding to a respective plane of said crystalline lattice.

8. An apparatus according to claim 7, wherein said first and second aligning members are each made of silicon.

9. An apparatus according to claim 1, wherein said first, second and third waveguides include optical fibers.

10. An apparatus according to claim 1, wherein each of said first and second switching portions has on said one end therein a first surface that forms an acute angle with respect to a longitudinal axis of said one end, and has on said other end therein a second surface that forms an acute angle with respect to a longitudinal axis of said other end, said first and second surfaces being spaced in said second position of said one end so as to cause said second surface to effect a total internal reflection of radiation reaching said second surface, and being adjacent and approximately parallel in said first position of said one end so as to inhibit a total internal reflection of radiation at said second surface.

11. An apparatus according to claim 1, including for each of said first and second switching portions a respective actuator which can selectively effect movement of said one end therein between said first and second positions thereof.

12. An apparatus, comprising:

a first aligning member having first and second sides, and having a plurality of first apertures which each extend between and open through each of said first and second sides thereof, each said first aperture having therein a respective first groove which extends between said first and second sides of said first aligning member;

a second aligning member having first and second sides, and having a plurality of second apertures which each extend between and open through each of said first and second sides thereof, each said second aperture having therein a respective second groove that extends between said first and second sides of said second aligning member, said first and second aligning members being fixedly coupled to each other with said second side of said second aligning member disposed adjacent said second side of said first aligning member in a manner so that each said first groove in a respective said first aperture extends substantially parallel to and has a predetermined alignment with respect to a respective said second groove in a respective said second aperture;

a plurality of first waveguides which extend approximately parallel to each other, which are each positioned against said first side of said first aligning member, and which each include a plurality of first sections arranged in an end-to-end relationship, the adjacent ends of each pair of adjacent said first sections forming a respective first switching portion which is disposed adjacent an end of a respective said first aperture and has one of said ends therein supported for movement between first and second positions respectively adjacent and spaced from the other of said ends therein;

a plurality of second waveguides which extend approximately parallel to each other, which are each positioned against said first side of said second aligning member, and which each include a plurality of second sections arranged in an end-to-end relationship, the adjacent ends of each pair of adjacent said second sections forming a respective second switching portion which is disposed adjacent an end of a respective said second aperture and has one of said ends therein supported for movement between first and second positions respectively adjacent and spaced from the other of said ends therein; and a plurality of third waveguides which are each disposed in a respective pair of said first and second grooves, each said third waveguide having opposite ends which are respectively disposed adjacent said other end in a respective said first switching portion and said other end in a respective said second switching portion;

wherein when said one end in each of said first and second switching portions is respectively in said first and second positions thereof, that switching portion respectively establishes a first optical path in which radiation travels between said one end and said other end therein exclusive of said third waveguide associated therewith, and a second optical path in which radiation travels between said other end therein and said third waveguide associated therewith exclusive of said one end therein.

13. An apparatus according to claim 12, wherein each said second waveguide extends approximately parallel to a plane which is perpendicular to each said first waveguide.

14. An apparatus according to claim 13, wherein each said third waveguide forms an acute angle with respect to said first waveguide associated therewith, and forms an acute angle with respect to said second waveguide associated therewith.

15. An apparatus according to claim 12, wherein each said first aperture has therein a plurality of interior surfaces arranged to give that first aperture approximately the shape of a pyramid which has a base at said second side of said first aligning member and which tapers progressively in cross-sectional size from said second side toward said first side of said first aligning member, each said first groove being defined by the intersection of two of said interior surfaces of a respective said first aperture; and wherein each said second aperture has therein a plurality of interior surfaces arranged to give that second aperture approximately the shape of a pyramid which has a base at said second side of said second aligning member and which tapers progressively in cross-sectional area from said second side toward said first side of said second aligning member, each said second groove being defined by the intersection of two of said interior surfaces of a respective said second aperture.

16. An apparatus according to claim 15, wherein said first and second aligning members are each made of an etchable material which has a crystalline lattice, said interior surfaces of said first and second apertures each corresponding to a respective plane of said crystalline lattice.

17. An apparatus according to claim 16, wherein said first aligning member has on said first side thereof a plurality of third grooves which each communicate with a respective subset of said first apertures, which each have a respective one of said first waveguides supported therein, and which each have therein two intersecting surfaces that each correspond to a respective plane of said crystalline lattice; and wherein said second aligning member has on said first side thereof a plurality of fourth grooves which each communicate with a respective subset of said second apertures, which each have a respective one of said second waveguides supported therein, and which each have therein two intersecting surfaces that each correspond to a respective plane of said crystalline lattice.

18. An apparatus according to claim 17, wherein said first and second aligning members each have parallel first and second surfaces which are respectively provided on said first and second sides thereof, said second surfaces being in engagement and being bonded to each other to effect said fixed coupling of said first and second aligning members, said first surface of said first aligning member having each of said third grooves therein, said first surface of said second aligning member having each of said fourth grooves therein, and said first and second surfaces each corresponding to a respective plane of said crystalline lattice.

19. An apparatus according to claim 18, wherein is said first and second aligning members are each made of silicon.

20. An apparatus according to claim 12, wherein said first, second and third waveguides include optical fibers.

21. An apparatus according to claim 12, wherein each of said first and second switching portions has on said one end therein a first surface that forms an acute angle with respect to a longitudinal axis of said one end, and has on said other end therein a second surface that forms an acute angle with respect to a longitudinal axis of said other end, said first and second surfaces being spaced in said second position of said one end so as to cause said second surface to effect a total internal reflection of radiation reaching said second surface, and being adjacent and approximately parallel in said first position of said one end so as to inhibit a total internal reflection of radiation at said second surface.

22. An apparatus according to claim 12, including for each of said first and second switching portions a respective actuator which can selectively effect movement of said one end therein between said first and second positions thereof.

23. A method, comprising the steps of:

creating a first aperture in a first aligning member which has first and second sides, said first aperture extending between and opening through each of said first and second sides of said first aligning member, and having therein a first groove which extends between said first and second sides of said first aligning member;

creating a second aperture in a second aligning member which has first and second sides, said second aperture extending between and opening through each of said first and second sides of said second aligning member, and having therein a second groove which extends between said first and second sides of said second aligning member;

fixedly coupling said first and second aligning members to each other with said second side of said second aligning member disposed adjacent said second side of said first aligning member in a manner so that said first groove in said first aperture extends substantially parallel to and has a predetermined alignment with respect to said second groove in said second aperture;

positioning against said first side of said first aligning member a first waveguide which includes two first sections arranged in an end-to-end relationship, the adjacent ends of said first sections forming a first switching portion which is disposed adjacent an end of said first aperture and has one of said ends therein supported for movement between first and second positions respectively adjacent and spaced from the other of said ends therein;

positioning against said first side of said second aligning member a second waveguide which includes two second sections arranged in an end-to-end relationship, the adjacent ends of said second sections forming a second switching portion which is disposed adjacent an end of said second aperture and has one of said ends therein supported for movement between first and second positions respectively adjacent and spaced from the other of said ends therein;

positioning in said first and second grooves a third waveguide so that opposite ends of said third waveguide are respectively disposed adjacent said other end in said first switching portion and said other end in said second switching portion; and causing each of said first and second switching portions to operate in a manner such that, when said one end therein is respectively in said first and second positions thereof, that switching portion respectively establishes a first optical path in which radiation travels between said one end and said other end therein exclusive of said third waveguide, and a second optical path in which radiation travels between said other end therein and said third waveguide exclusive of said one end therein.

24. A method according to claim 23, wherein said step of creating said first aperture includes the step of creating in said first aperture a plurality of interior surfaces arranged to give said first aperture approximately the shape of a pyramid that has a base at said second side of said first aligning member and that tapers progressively in cross-sectional size from said second side toward said first side of said first aligning member, said first groove being defined by the intersection of two of said interior surfaces of said first aperture; and wherein said step of creating said second aperture includes the step of creating in said second aperture a plurality of interior surfaces arranged to give said second aperture approximately the shape of a pyramid that has a base at said second side of said second aligning member and that tapers progressively in cross-sectional area from said second side toward said first side of said second aligning member, said second groove being defined by the intersection of two of said interior surfaces of said second aperture.

25. A method according to claim 24, including the step of selecting as the material of each of said first and second aligning members an etchable material which has a crystalline lattice, and wherein said creating steps are carried out by etching said first and second aligning members, said interior surfaces of said first and second apertures each corresponding to a respective plane of said crystalline lattice.

26. A method according to claim 25, including the step of etching said first side of said first aligning member to create a third groove which communicates with said first aperture, which has said first waveguide supported therein, and which has two intersecting surfaces that each correspond to a respective plane of said crystalline lattice; and including the step of etching said first side of said second aligning member to create a fourth groove which communicates with said second aperture, which has said second waveguide supported therein, and which has two intersecting surfaces that each correspond to a respective plane of said crystalline lattice.

27. A method according to claim 26, wherein said selecting step is carried out by selecting silicon as the material from which said first and second aligning members are made.

28. A method according to claim 23, including the steps of forming on said one end in each of said first and second switching portions a first surface that forms an acute angle with respect to a longitudinal axis of said one end, and forming on said other end in each of said first and second switching portions a second surface that forms an acute angle with respect to a longitudinal axis of said other end, said first and second surfaces being spaced in said second position of said one end so as to cause said second surface to effect a total internal reflection of radiation reaching said second surface, and being adjacent and approximately parallel in said first position of said one end so as to inhibit a total internal reflection of radiation at said second surface.

* * * * *